United States Patent
Higuchi et al.

(10) Patent No.: US 10,124,646 B2
(45) Date of Patent: Nov. 13, 2018

(54) METHOD OF MANUFACTURING RUBBER-BUSH-PROVIDED STABILIZER BAR AND RUBBER-BUSH-PROVIDED STABILIZER BAR

(71) Applicant: MITSUBISHI STEEL MFG. CO., LTD., Tokyo (JP)

(72) Inventors: Daisuke Higuchi, Chiba (JP); Yohei Okada, Chiba (JP); Takuya Matsuda, Chiba (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 0 days.

(21) Appl. No.: 14/909,771

(22) PCT Filed: Aug. 7, 2015

(86) PCT No.: PCT/JP2015/072561
§ 371 (c)(1),
(2) Date: Feb. 3, 2016

(87) PCT Pub. No.: WO2016/031536
PCT Pub. Date: Mar. 3, 2016

(65) Prior Publication Data
US 2016/0257178 A1    Sep. 8, 2016

(30) Foreign Application Priority Data
Aug. 28, 2014 (JP) .................. 2014-174407

(51) Int. Cl.
*B60G 21/055* (2006.01)
*F16F 15/08* (2006.01)
(Continued)

(52) U.S. Cl.
CPC .......... *B60G 21/0551* (2013.01); *B29C 65/02* (2013.01); *B29C 65/48* (2013.01);
(Continued)

(58) Field of Classification Search
CPC .......... F16F 15/08; B29C 65/02; B29C 65/48; B60G 2204/41; B60G 2204/1222;
(Continued)

(56) References Cited

U.S. PATENT DOCUMENTS

2005/0155702 A1\* 7/2005 Ganz ................. B29C 65/46
156/272.4
2009/0152969 A1 6/2009 Narita et al.
2014/0326411 A1\* 11/2014 Konita .................. B29C 65/02
156/379.6

FOREIGN PATENT DOCUMENTS

DE    102010022485    12/2011
DE    102010054503    6/2012
(Continued)

OTHER PUBLICATIONS

Machine translation of DE 10 2009 011 818 A1.\*
(Continued)

*Primary Examiner* — Vishal I Patel
(74) *Attorney, Agent, or Firm* — IPUSA, PLLC (57) ABSTRACT

A method includes a coating step of coating a vulcanizing adhesive at a surface of a vulcanized centrum of a rubber bush; a heating step of heating a portion to be adhered of a stabilizer bar; a fitting step of fitting the centrum of the rubber bush at which the vulcanizing adhesive is coated on the heated portion to be adhered of the stabilizer bar; and an adhering step of clamping the rubber bush in a radial direction by a clamping device to adhere the rubber bush on the portion to be adhered of the stabilizer bar.

7 Claims, 11 Drawing Sheets

(51) Int. Cl.
    *B29C 65/02*     (2006.01)
    *B29C 65/48*     (2006.01)
    *B29L 31/30*     (2006.01)

(52) U.S. Cl.
    CPC .......... *F16F 15/08* (2013.01); *B29L 2031/30* (2013.01); *B60G 2202/135* (2013.01); *B60G 2204/1222* (2013.01); *B60G 2204/41* (2013.01); *B60G 2206/82* (2013.01); *B60G 2206/821* (2013.01)

(58) Field of Classification Search
    CPC ............ B60G 2206/82; B60G 21/0551; B60G 2202/135; B29L 2031/30
    See application file for complete search history.

(56) References Cited

FOREIGN PATENT DOCUMENTS

| | | |
|---|---|---|
| DE | 102009011818 | 3/2016 |
| JP | S56-069143 | 6/1981 |
| JP | H9-317805 | 12/1997 |
| JP | 2001-271859 | 10/2001 |
| JP | 2004-353798 | 12/2004 |
| JP | 2006-220189 | 8/2006 |
| JP | 2006-290313 | 10/2006 |
| JP | 2009-148132 | 7/2009 |
| WO | 03/097333 | 11/2003 |

OTHER PUBLICATIONS

Japanese Official Notification dated Oct. 4, 2016.
International Search Report dated Oct. 13, 2015.
Extended European Search Report dated Oct. 26, 2016.
European Office Action for 15825781.6 dated Nov. 3, 2017.
Japanese Official Notification for 2014-174407 dated Mar. 27, 2018.

* cited by examiner

METHOD OF MANUFACTURING RUBBER-BUSH-PROVIDED STABILIZER BAR AND RUBBER-BUSH-PROVIDED STABILIZER BAR

BACKGROUND OF THE INVENTION

1. Field of the Invention

The present invention relates to a method of manufacturing a rubber bush provided stabilizer bar and a rubber bush provided stabilizer bar.

2. Description of the Related Art

For a vehicle such as an automobile, a rubber bush provided stabilizer bar (anti-roll bar) is connected to stabilize the position of the vehicle. The stabilizer bar is a member that mainly suppresses the body roll of the vehicle (rotational motion around a back and front direction of the vehicle body as an axis) using torsion toque. The rubber bush is attached between the stabilizer bar and the vehicle body and has a function to support the vehicle body by dampening transferring of the oscillation that is input to the stabilizer bar due to a condition of a road surface to the vehicle body, and flexibly following the movement of the stabilizer bar.

Conventionally, the rubber bush provided stabilizer bar is mainly an unbonded type in which the stabilizer bar is only inserted in the rubber bush. However, the unbonded type has a problem in that strange noises are generated or positional shift between the stabilizer bar and the rubber bush occurs.

In view of the above described problem, a technique is known in which a rubber bush is adhered to a stabilizer bar by vulcanizing adhesion. For example, a rubber bush, provided with a centrum at which a vulcanizing adhesive (cure adhesive) is coated, is fitted on a portion to be adhered of the stabilizer bar. Then, portions of the stabilizer bar that are positioned outer side of the fitted position are heated by high-frequency induction heating to heat the portion to be adhered by heat conduction and cause a vulcanizing reaction so that the rubber bush and the stabilizer bar are adhered (see Patent Document 1, for example).

PATENT DOCUMENT

[Patent Document 1] Japanese Laid-open Patent Publication No. 2006-290313

It is said that in order to cause an appropriate vulcanizing reaction at the portion to be adhered of the stabilizer bar within a short period (about 30 seconds to 5 minutes), it is necessary to heat at greater than or equal to 180° C. In the above described technique, the portion to be adhered of the stabilizer bar is heated from the both outer side portions of the fitted rubber bush by heat conduction. Thus, in order to heat the portion to be adhered at greater than or equal to 180° C., it is necessary to heat the both outer side portions of the rubber bush to be higher than the portion to be adhered such as 360° C. or the like, for example, or it is necessary to heat it at greater than or equal to 180° C. for a long period.

However, if the stabilizer bar is heated by high heat, poor appearance may occur such as clouding may occur at a coated surface of the heated position, or the coated film is damaged as being melted. Further, if it is heated for a long period, working efficiency is lowered and is not economic.

Adhesion accuracy between the rubber bush and the stabilizer bar depends on an appropriate temperature management of the portion to be adhered. However, according to the conventional technique, as the portion to be adhered is heated from both outer side portions by heat conduction, the temperature management is difficult because it is necessary to consider influences of efficiency of heat transfer, heat dissipation or the like. Thus, there is a possibility that the adhesion accuracy may vary.

SUMMARY OF THE INVENTION

The present invention is made in light of the above problems, and provides a method of manufacturing a rubber bush provided stabilizer bar capable of preventing poor appearance of the stabilizer bar and lowering of working efficiency, and stably obtaining high adhesion accuracy by appropriately performing a temperature management of a portion to be adhered.

According to an embodiment, there is provided a method of manufacturing a rubber bush provided stabilizer bar by adhering a tubular shape rubber bush provided with a vulcanized centrum on a portion to be adhered of a stabilizer bar, the method including: a coating step of coating a vulcanizing adhesive at a surface of a centrum of the rubber bush; a heating step of heating the portion to be adhered of the stabilizer bar; a fitting step of fitting the centrum of the rubber bush at which the vulcanizing adhesive is coated on the heated portion to be adhered of the stabilizer bar; and an adhering step of clamping the rubber bush in a radial direction by a clamping device to adhere the rubber bush on the portion to be adhered of the stabilizer bar.

According to the invention, a method of manufacturing a rubber bush provided stabilizer bar can be provided capable of preventing poor appearance of the stabilizer bar and lowering of working efficiency, and stably obtaining high adhesion accuracy by appropriately performing a temperature management of a portion to be adhered.

DETAILED DESCRIPTION OF THE PREFERRED EMBODIMENTS

Next, embodiments of a method of manufacturing a rubber bush provided stabilizer bar (a stabilizer bar provided with a rubber bush) and a rubber bush provided stabilizer bar of the invention are explained. In the drawings, the same components are given the same reference numerals, and explanations are simplified or not repeated. The drawings are not purposed to indicate relative ratio of a member or between members. Thus, specific sizes of the members may be respectively determined by those skilled in the art according to the following non limiting embodiments.

First Embodiment

Figure 1:
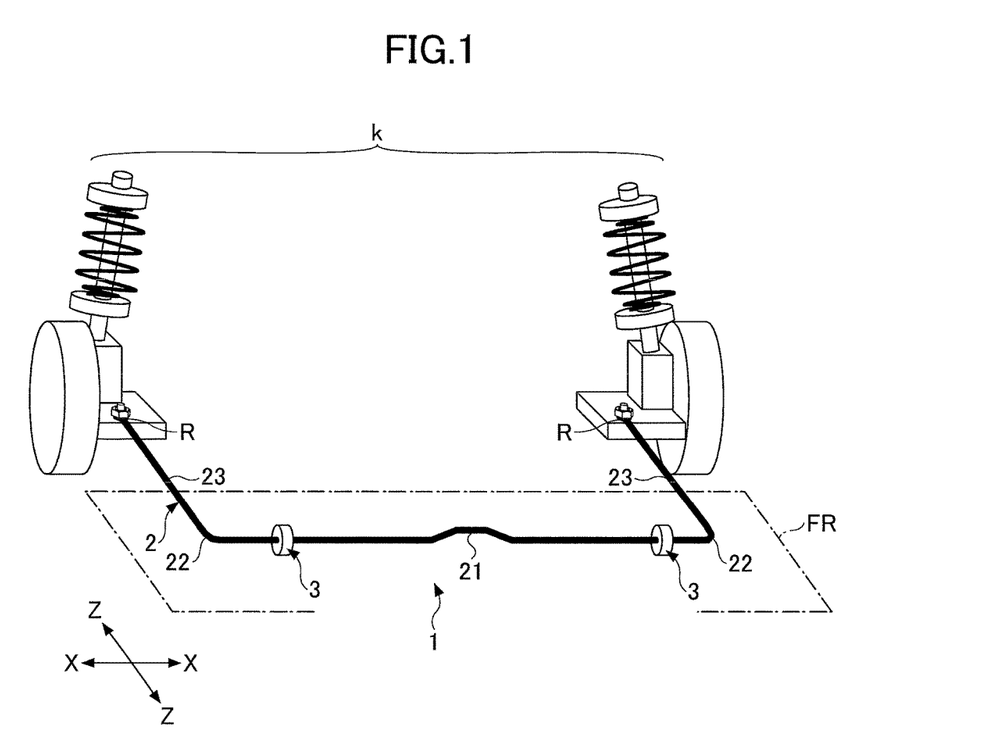
FIG. 1 is a perspective view illustrating a rubber bush provided stabilizer bar of a first embodiment and suspensions of front wheels of a vehicle.
Figure 2:
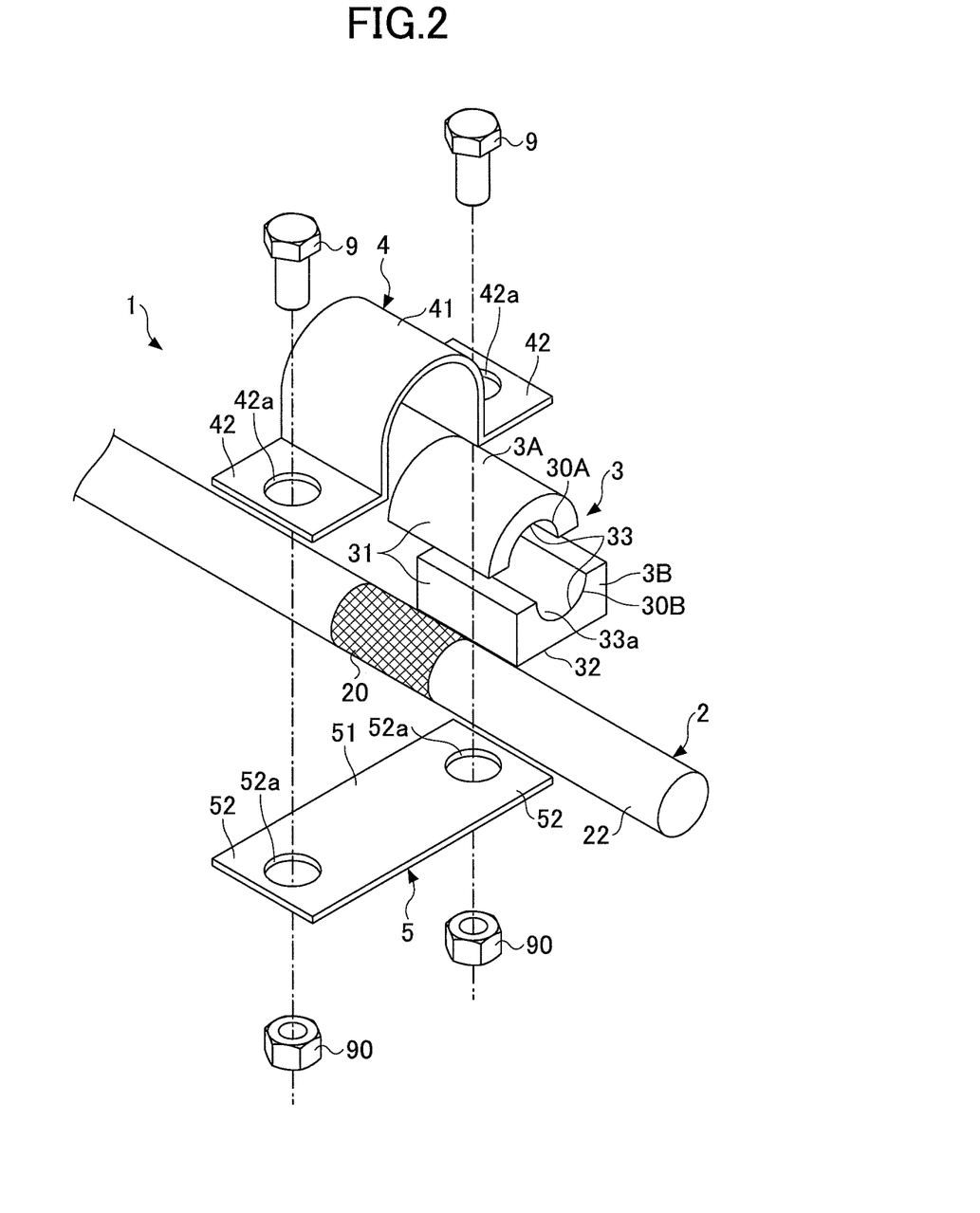
FIG. 2 is an exploded perspective view of the rubber bush provided stabilizer bar of the first embodiment.
Figure 3:
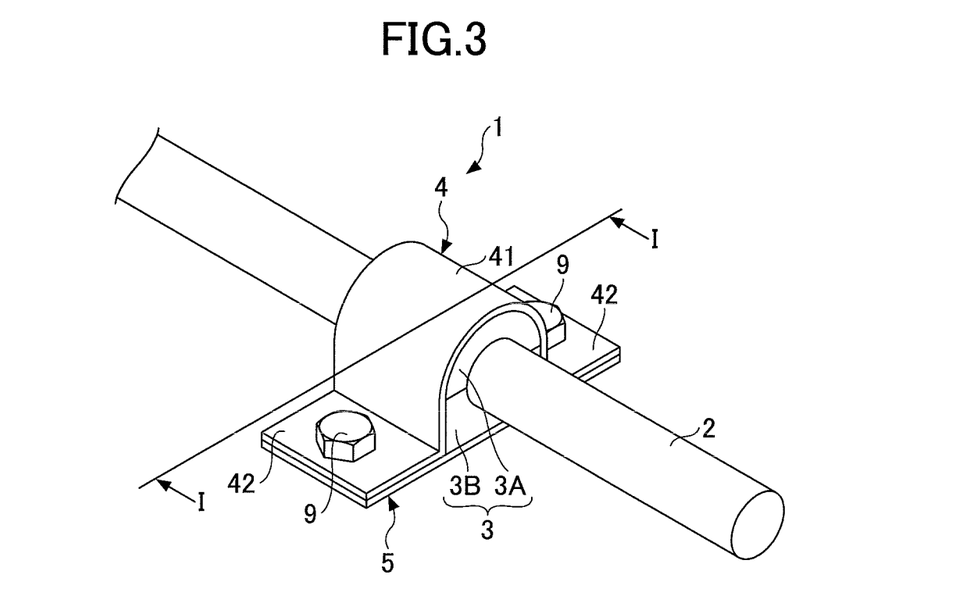
FIG. 3 is a perspective view illustrating the entirety of the rubber bush provided stabilizer bar of the first embodiment.
Figure 4:
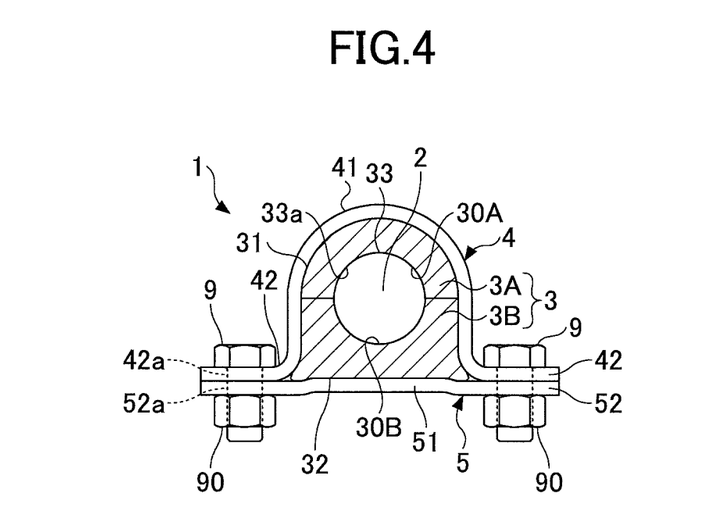
FIG. 4 is a cross-sectional view taken along line I-I FIG. 3.

The structure of a rubber bush provided stabilizer bar 1 of the first embodiment is explained with reference to FIG. 1 to FIG. 4. FIG. 1 is a perspective view illustrating the rubber bush provided stabilizer bar 1 of the first embodiment and suspensions k of front wheels of a vehicle. FIG. 2 is an exploded perspective view illustrating the structure of the rubber bush provided stabilizer bar 1. FIG. 3 is a perspective view illustrating the entirety of the rubber bush provided stabilizer bar 1. FIG. 4 is a cross-sectional view of FIG. 3 taken along line I-I.

As illustrated in FIG. 1, the rubber bush provided stabilizer bar 1 includes a stabilizer bar 2 composed of a metal solid member, and rubber bushes 3 that fix the stabilizer bar 2 to a frame portion FR of a vehicle body.

The stabilizer bar 2 includes a torsion portion 21 that is bridged in a width direction X of the vehicle body, shoulder portions 22 that are positioned at both ends of the torsion portion 21, respectively, and arm portions 23 that extend from the shoulder portions 22, respectively, in a back and front direction Z of the vehicle body. The stabilizer bar 2 is formed such that its entirety has a substantially U shape. Further, link members R are provided at front end portions of the arm portions 23 to be connected with acting portions of the suspensions k, respectively. It is assumed that inner side positions of the left and right shoulder portions 22 of the stabilizer bar 2 are portions to be adhered 20 (see FIG. 2) on which the rubber bushes 3 are adhered, respectively.

The surface of the above described stabilizer bar 2 is coated by an epoxy or epoxypolyester coating by cationic electrodeposition coating or powder coating.

Here, conventionally, a problem exists in that when the coated position is heated at greater than or equal to 300° C., clouding or the like is generated at the coated surface to cause poor appearance. As will be explained later, according to the method of manufacturing the rubber bush provided stabilizer bar of the embodiment, a heating step of the stabilizer bar is separately performed as a preceding step, it is possible to heat the stabilizer bar at a lower temperature zone compared with conventional cases and generation of poor appearance at the heated position can be prevented.

As illustrated in FIG. 2 to FIG. 4, the rubber bush provided stabilizer bar 1 of the embodiment has a structure in which the rubber bush 3 is fitted on the portion to be adhered 20 of the stabilizer bar 2, and an upper bracket member 4 and a lower bracket member 5 are fitted on an outer peripheral surface of each of the rubber bush 3.

The rubber bush 3 is formed to have a tubular shape including a U shaped outer wall surface 31 and a linear flat surface 32 that is continuously formed from both lower end portions of the outer wall surface 31. Further, the rubber bush 3 is provided with a hollow hole 33 (corresponding to a centrum) at a substantially center position for housing the portion to be adhered 20 of the stabilizer bar 2.

The rubber bush 3 as illustrated is divided into an upper half portion 3A and a lower half portion 3B, and the hollow hole 33 is formed by fitting semicircular shaped concave portions 30A and 30B provided at inner side surfaces of the upper half portion 3A and the lower half portion 3B, respectively.

A vulcanizing adhesive is coated at a surface 33a of the above described hollow hole 33, and is adhered with the portion to be adhered 20 of the stabilizer bar 2 by vulcanizing adhesion. The material of the rubber bush 3 is a rubber, and a synthetic rubber obtained by synthesizing a natural rubber (NR) and a butadiene rubber (BR) is used, for example, and which is previously vulcanized. The material of the synthetic rubber is not limited to the above described one and other materials may be used.

The upper bracket member 4 includes a housing portion 41 that houses a U shaped outer wall surface 31 of the rubber bush 3, and flange portions 42 that extend from both ends of the housing portion 41 in a horizontal direction and are provided with bolt holes 42a, respectively. The housing portion 41 is formed to have a U shape that extends along the outer wall surface 31 of the rubber bush 3.

The lower bracket member 5 includes a housing portion 51 that houses the flat surface 32 of the rubber bush 3, and flange portions 52 that extend from both ends of the housing portion 51 in a horizontal direction and are provided with bolt holes 52a, respectively. Although the housing portion 51 and the flange portions 52 are provided to form a continuous horizontal surface, this is not limited so. The housing portion 51 and the flange portions 52 may be appropriately designed in accordance with the shape of the rubber bush 3. It is preferable that the materials of the upper bracket member 4 and the lower bracket member 5 are metal such as an aluminum alloy or the like.

In the rubber bush provided stabilizer bar 1 of the embodiment, under a status that the above described upper bracket member 4 houses the outer wall surface 31 of the rubber bush 3 and the lower bracket member 5 houses the flat surface 32 of the rubber bush 3, bolt holes 42a and 52a of the flange portions 42 and 52 are matched and bonded by the bolts 9 and the nuts 90. It is apparent that the upper bracket member 4 and the lower bracket member 5 are not only bonded by the bolts 9 and nuts 90 but may be bonded by other bonding methods that are generally adopted such as bonding by pins or the like. Further, although the illustrated rubber bush 3 is divided into the upper half portion 3A and the lower half portion 3B, this is not limited so. The rubber bush 3 may be integrally formed one in which a single slit extending along a radial direction and an axis direction is formed.

(Method of Manufacturing)

Next, a method of manufacturing the rubber bush provided stabilizer bar 1 is explained.

(1) Coating Step

Chemlok (registered trademark) manufactured by LORD Corporation is coated on the surface 33a of the hollow hole 33 of the vulcanized rubber bush 3 as a vulcanizing adhesive. Specifically, it is preferable that Chemlok 6100 is undercoated, and thereafter, Chemlok 205 is over coated thereon.

(2) Heating Step

Figure 5A:
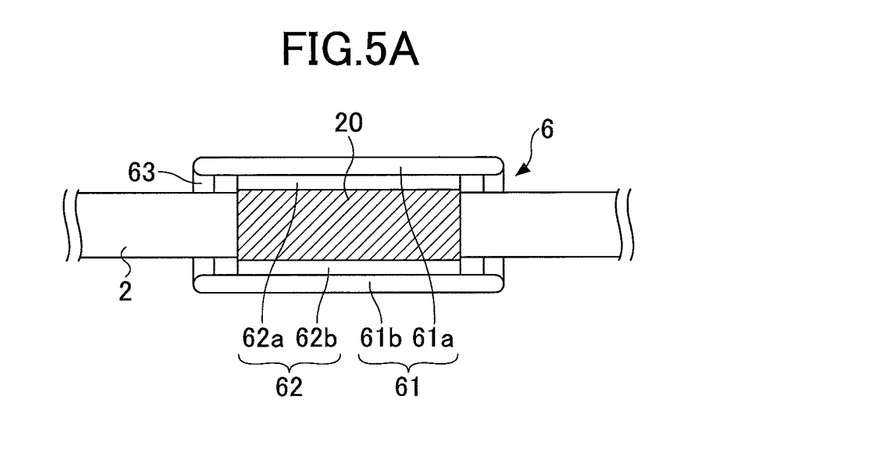
FIG. 5A is a front view illustrating an example of a coil portion of a high-frequency induction heating device used in a heating step.
Figure 5B:
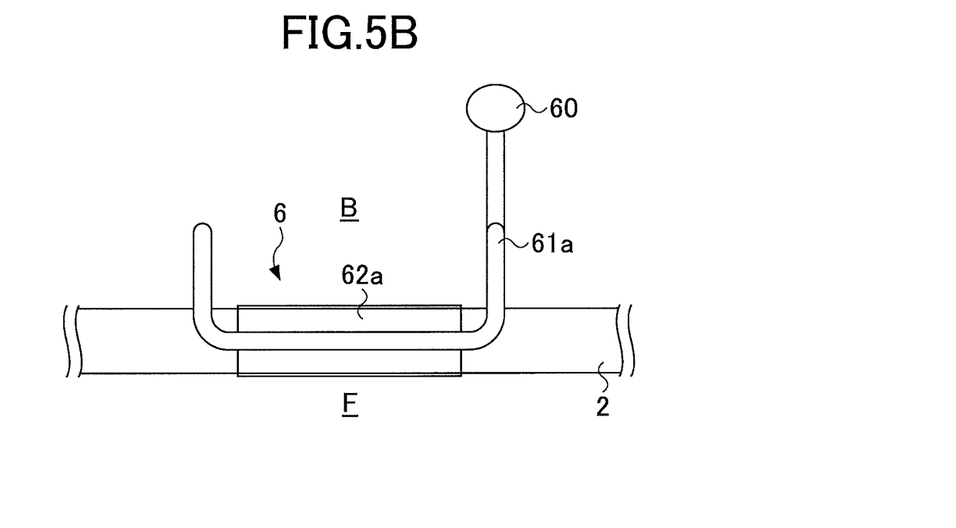
FIG. 5B is a plan view illustrating an example of the coil portion of the high-frequency induction heating device used in the heating step.
Figure 5C:
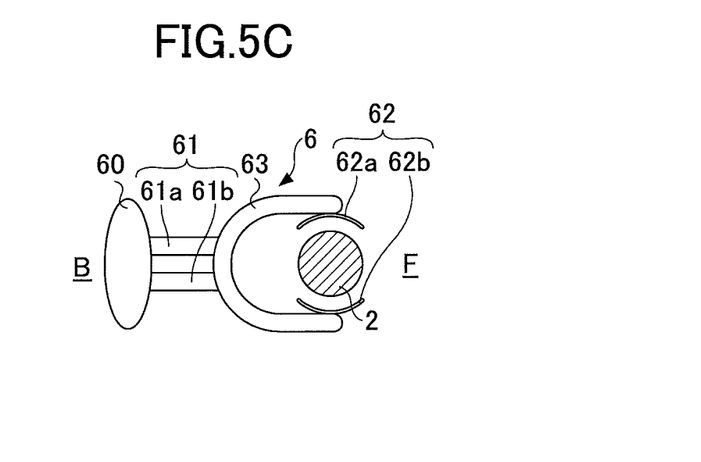
FIG. 5C is a side view illustrating an example of the coil portion of the high-frequency induction heating device used in the heating step.

Next, the portion to be adhered 20 of the stabilizer bar 2 is heated using a high-frequency induction heating device by high-frequency induction heating. FIG. 5 illustrates an example of a coil portion of the high-frequency induction heating device used in this embodiment. FIG. 5A is a front view, FIG. 5B is a plan view and FIG. 5C is a side view.

A coil portion 6 as illustrated includes arm portions 61 that are extended from a high frequency power source 60 and a pair of upper and lower holding portions 62 that are connected to the arm portions 61 and support an upper surface portion and a lower surface portion of the stabilizer bar 2 to input high frequency. The holding portions 62 includes an upper holding portion 62a and a lower holding portion 62b that are positioned to face each other in an upper and lower direction. The arm portions 61 includes an upper arm portion 61a that is connected to an upper surface of the upper holding portion 62a and a lower arm portion 61b that is connected to a lower surface of the lower holding portion 62b. The upper arm portion 61a and the lower arm portion 62b are connected by a connecting member 63 at a back side B (high frequency power source 60 side) of the coil portion 6 so that members of the arm portions 61 do not exist at a front side F of the coil portion 6. Thus, it is easy to place the stabilizer bar 2 at the holding portions 62, and it is easy to detach as well. Further, each of the upper holding portion 62a and the lower holding portion 62b of the holding portions 62 has a width substantially the same as that of the portion to be adhered 20 of the stabilizer bar 2, and has a curved shape that extends along an outer peripheral surface of the stabilizer bar 2. Thus, the portion to be adhered 20 of the stabilizer bar 2 can be uniformly heated.

Hereinafter, a specific method for heating the portion to be adhered 20 of the stabilizer bar 2 using the above structured coil portion 6 by high-frequency induction heating is explained.

First, the portion to be adhered 20 of the stabilizer bar 2 is placed between the upper holding portion 62a and the lower holding portion 62b of the coil portion 6 and is held. Then, the high frequency power source 60 is operated while holding the portion to be adhered 20 to heat the portion to be adhered 20 of the stabilizer bar 2 by high-frequency induction heating. For the heating temperature, it is necessary to consider temperature at which a vulcanizing reaction occurs and temperature at which a coated film of the stabilizer bar 2 does not melt. The temperature at which an appropriate vulcanizing reaction is expected is greater than or equal to 180° C. and it is assumed that temperature at which the coated film of the stabilizer bar 2 of the embodiment melts is greater than or equal to 280° C. Here, it is confirmed that, for a case in which the diameter of the stabilizer bar 2 is 25 mm, the vulcanizing reaction occurs at 160° C. as temperature at which the vulcanizing reaction occurs.

Thus, in this embodiment, the portion to be adhered 20 of the stabilizer bar 2 is heated at temperature greater than or equal to 160° C. and less than 280° C.

This heating is continued until a center portion of the portion to be adhered 20 of the stabilizer bar 2 becomes the above described temperature, greater than 160° C. and less than 280° C. This is because it is necessary for the portion to be adhered 20 of the stabilizer bar 2 to maintain the temperature that can cause the vulcanizing reaction to occur until adhering with the rubber bush 3, which will be explained later.

Although heating time necessary to heat the center portion of the portion to be adhered 20 depends on the material or the diameter of the stabilizer bar 2, as an example, the heating time is about 60 seconds for a case of a stabilizer bar where epoxy polyester coating is used to coat and whose diameter is 15 mm or 35 mm. At this time, it is preferable that the temperature is increased to predetermined temperature within the above described range during the first 30 seconds, and the predetermined temperature is retained during the latter 30 seconds. Of course, the time may be less than or equal to 60 seconds, and time allocation of increasing and retaining may be appropriately varied.

Further, in order to heat the center portion of the portion to be adhered 20 by heat high-frequency induction heating, it is necessary to appropriately set frequency. In the high-frequency induction heating, current mostly flows at a heating surface to heat, and the center portion of the material is heated by heat conduction from the surface. Thus, the deeper the depth of penetration of the current is, the center portion can be also efficiently heated. The depth of penetration of the current inverses the frequency and the depth of penetration of the current becomes deeper with the lower frequency. In this embodiment, heating is performed at the frequency of 1 kHz to 50 kHz.

It is confirmed that the center temperature of greater than or equal to 200° C. can be maintained greater than or equal to 4 minutes when a stabilizer bar whose diameter is 35 mm is used and heated by setting the frequency as 45 kHz.

Further, as a result of measuring remaining stress when the stabilizer bar 2 is heated within the above described ranges of the temperature and the time, it is confirmed that there is no problem in quality of the remaining stress as there is no difference between the remaining stress at any temperature zones compared with a stabilizer bar 2 that is not heated.

Further, a coated film performance for the case when the stabilizer bar 2 is heated within the above described ranges of the temperature and the time was measured by a salt spray test. Specifically, a cross cut is formed at the portion to be adhered of the stabilizer bar, and salt spray was continuously performed at the cross cut portion for 860 hours. As a result, at any temperature zones, poor appearance such as blistering, peeling of the coated film did not occur at a position near (3 mm) the cross cut portion. As the rubber bush 3 is fitted on the portion to be adhered 20 of the stabilizer bar 2 of the embodiment and the portion to be adhered 20 is not exposed, the coated film performance of the portion to be adhered 20 can be surely ensured.

For the above described heating temperature, temperature range of greater than or equal to 160° C. and less than 280° C., the upper limit value may be arbitrarily varied based on the materials, the kind of coating, and the diameters of the stabilizer bar 2 and the rubber bush 3.

As a condition of the upper limit value, it may be set at (upper limit) temperature at which the portion to be adhered 20 of the stabilizer bar 2 is not damaged, and temperature at which the rubber bush 3 can exert an adhesive performance. The damage here indicates melting or burning of coating, and lowering of remaining stress. Further, the temperature at which the adhesive performance can be exerted means temperature at which the rubber bush 3 can appropriately perform vulcanizing adhesion. As the lower limit value is also varied based on the diameter or the material of the stabilizer bar 2, it can be appropriately varied as long as minimum temperature at which the vulcanizing reaction is surely occurred is ensured.

Here, the operating time in the above described heating step is about 75 seconds in total including 60 seconds for heating time and 15 seconds for detaching the stabilizer bar 2 from the holding portions 62 of the high-frequency induction heating device.

(3) Fitting Step

Next, a fitting step is performed in which the hollow hole 33 of the rubber bush 3 at which the vulcanizing adhesive is coated is fitted on the portion to be adhered 20 of the stabilizer bar 2 heated in the heating step.

In this embodiment, the rubber bush 3 has a structure to be housed in (fitted by) the upper bracket member 4 and the lower bracket member 5. Thus, hereinafter, steps of a fitting step in which the rubber bush 3, the upper bracket member 4 and the lower bracket member 5 are fitted to (fitted on) the portion to be adhered 20 of the stabilizer bar 2 are explained with references to FIG. 6A to FIG. 6C.

Figure 6A:
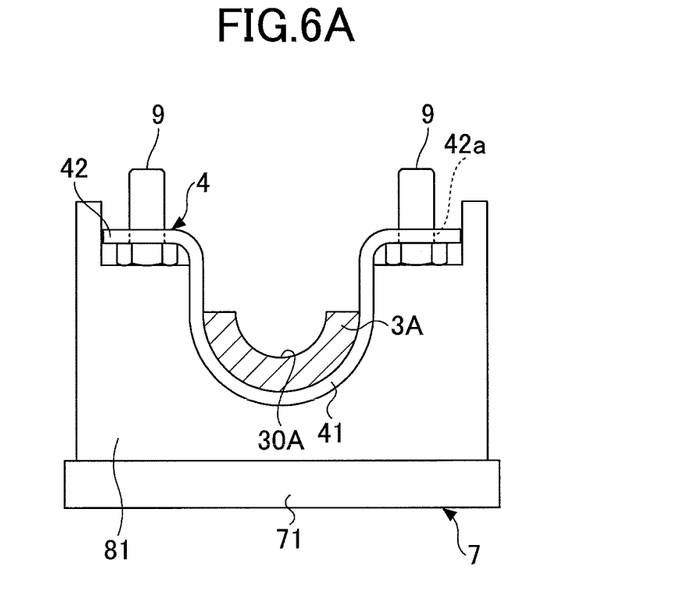
FIG. 6A is a view (1) for explaining steps of a fitting step in which a rubber bush is fitted on a portion to be adhered of the stabilizer bar.

First, as illustrated in FIG. 6A, the upper bracket member 4 and the upper half portion 3A of the rubber bush 3 are placed in an inner side surface of a lower jig 81 that is provided at an upper surface of a base portion 71 of a clamping device 7. Here, the inner side surface of the lower jig 81 is formed to have a shape that extends along an outer peripheral shape of the upper bracket member 4.

Specifically, first, the upper bracket member 4 is placed in the inner side surface of the lower jig 81, and the upper half portion 3A of the rubber bush 3 is placed on an inner side surface of the housing portion 41 of the upper bracket member 4. At this time, bolts 9 are inserted in bolt holes 42a of the upper bracket member 4, respectively.

Figure 6B:
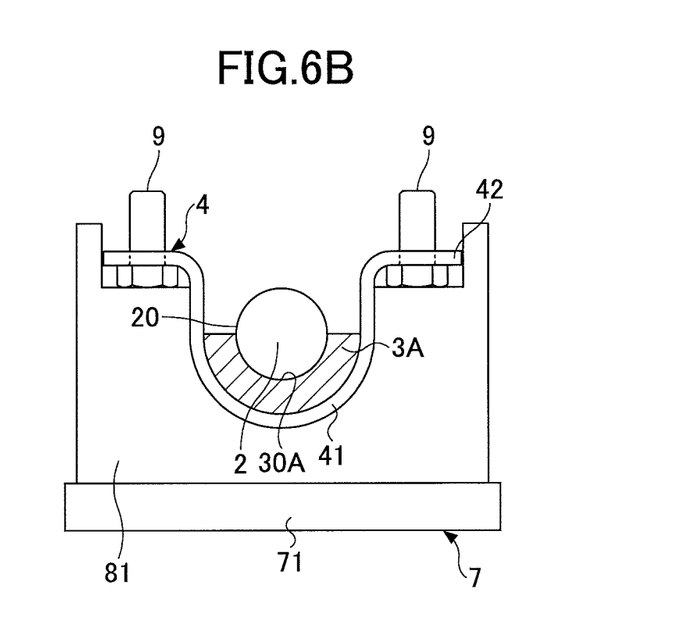
FIG. 6B is a view (2) for explaining the steps of the fitting step in which the rubber bush is fitted on the portion to be adhered of the stabilizer bar.

Next, as illustrated in FIG. 6B, the heated portion to be adhered 20 of the stabilizer bar 2 is placed on the above described concave portion 30A of the upper half portion 3A of the rubber bush 3. At this time, lower half of the stabilizer bar 2 in the drawing contacts the concave portion 30A of the upper half portion 3A of the rubber bush 3 and upper half of the stabilizer bar 2 in the drawing is exposed.

Figure 6C:
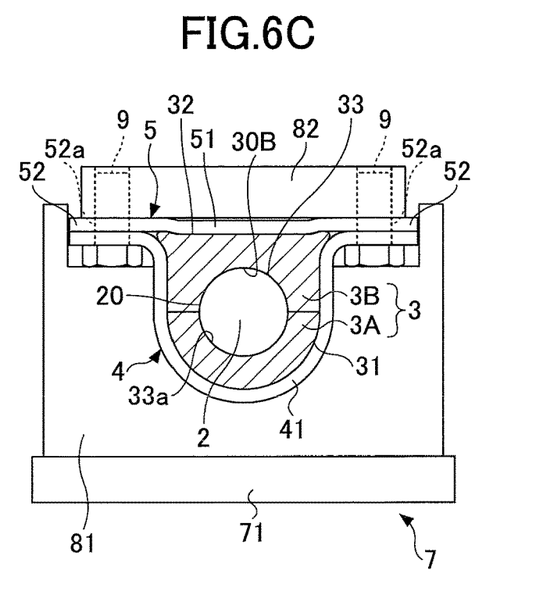
FIG. 6C is a view (3) for explaining the steps of the fitting step in which the rubber bush is fitted on the portion to be adhered of the stabilizer bar.

Then, as illustrated in FIG. 6C, the concave portion 30B of the lower half portion 3B of the rubber bush 3 is fitted to the exposed upper half of the portion to be adhered 20 of the stabilizer bar 2. Thus, at this time, the outer peripheral surface of the portion to be adhered 20 of the stabilizer bar 2 contacts the surface 33a of the hollow hole 33 that is formed by the concave portions 30A and 30B of the upper half portion 3A and the lower half portion 3B, respectively, of the rubber bush 3.

After fitting the rubber bush 3 on the portion to be adhered 20 of the stabilizer bar 2, the lower bracket member 5 is placed on the flat surface 32 of the rubber bush 3. At this time, the lower bracket member 5 is placed such that the above described bolts 9 are inserted in the bolt holes 52a of the flange portions 52, respectively. Then, the outer wall surface 31 of the rubber bush 3 is housed in the housing portion 41 of the upper bracket member 4 and the flat surface 32 of the rubber bush 3 is hosed in the housing portion 51 of the lower bracket member 5. Then, an upper jig 82 that fixes the fitting status of the members and compresses the rubber bush 3, is provided at a back surface side of the lower bracket member 5.

The above described fitting step with reference to FIG. 6A to FIG. 6C is performed when the rubber bush 3 is half cut. Thus, the fitting step is not limited to the structure illustrated in the drawings.

Although not illustrated in the drawings, when fitting a rubber bush 3 provided with a single slit for attachment on the portion to be adhered 20 of the stabilizer bar 2, the rubber bush 3 may be fitted on the portion to be adhered 20 by expanding the slit. Thereafter, substantially similarly to the above described steps, the rubber bush 3 housing the stabilizer bar 2 is placed on an inside surface of the housing portion 41 of the upper bracket member 4, and the lower bracket member 5 is placed on the flat surface 32 of the rubber bush 3 to be fitted.

(4) Adhering Step

Next, an adhering step in which the rubber bush 3 housing the stabilizer bar 2 is clamped to adhere the rubber bush 3 and the stabilizer bar 2 is performed. Steps of the adhering step are explained with reference to FIG. 7A and FIG. 7B.

Figure 7A:
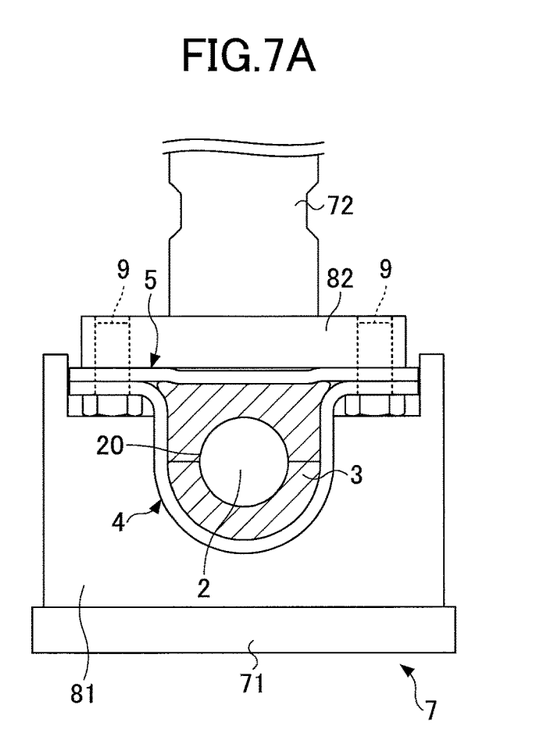
FIG. 7A is a view (1) for explaining steps from an adhering step in which the stabilizer bar and the rubber bush are adhered, to a leaving step.

As illustrated in FIG. 7A, under a status that the rubber bush 3, the upper bracket member 4 and the lower bracket member 5 are fitted on the portion to be adhered 20 of the stabilizer bar 2, a pressing portion 72 of the clamping device 7 is set on an upper surface of the upper jig 82 and is pressed. Then, the rubber bush 3 is clamped in a radial direction by the pressing portion 72 and the base portion 71 of the clamping device 7 and the rubber bush 3 can be fixed on the stabilizer bar 2. Thus, the pressing force for pressing the rubber bush 3 by the clamping device 7 is considerably higher than the pressing force (compressive force) by the jig. Here, the pressing time and the pressing force pressing the rubber bush 3 by the clamping device 7 are set at an optimal condition in accordance with the material or the diameter of the rubber bush 3.

As described above, the temperature of the portion to be adhered 20 of the stabilizer bar 2 when it is clamped by the clamping device 7 is retained at greater than or equal to 180° C. which is necessary for the appropriate vulcanizing reaction. Thus, the vulcanizing reaction (crosslinking reaction) between the surface 33a of the hollow hole 33 of the rubber bush 3 on which the vulcanizing adhesive is coated and the portion to be adhered 20 of the stabilizer bar 2 occurs and the rubber bush 3 and the portion to be adhered 20 of the stabilizer bar 2 can be surely adhered by vulcanizing adhesion.

Figure 7B:
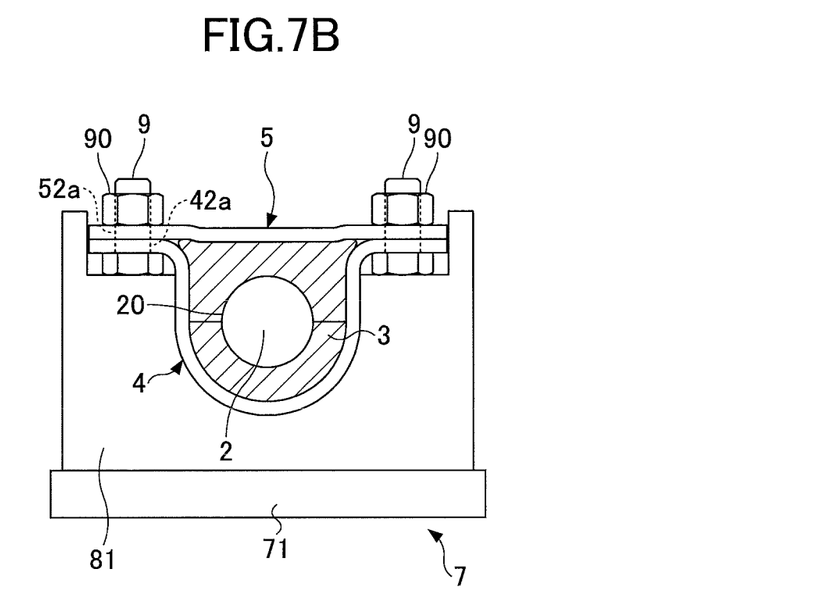
FIG. 7B is a view (2) for explaining the steps from the adhering step in which the stabilizer bar and the rubber bush are adhered, to the leaving step.

Then, as illustrated in FIG. 7B, the upper jig 82 is appropriately detached and the nuts 90 are screwed to the bolts 9 that are inserted in the bolt holes 42a and 52a of the upper bracket member 4 and the lower bracket member 5 to be fastened, respectively. As described above, by retaining a clamping status in the radial direction to the rubber bush 3 by the bolts 9 and the nuts 9, adhesion accuracy can be increased.

Here, when manufacturing a plurality of rubber bush provided stabilizer bars 1 by heating the plurality of stabilizer bars 2 in order, when assuming that the pressing time in the adhering step is one minute, for example, the fitting step and the adhering step can be performed for a preceding stabilizer bar 2 that is already heated during 75 seconds while the stabilizer bar 2 is heated (including detaching the stabilizer bar 2). Here, in the conventional example, as the fitting step, the heating step and the adhering step are continuously performed at the same place, other tasks cannot be performed while performing the fitting step to the adhering step.

However, as described above, according to the manufacturing method of the embodiment, the heating step is performed separately as a preceding step, the total manufacturing time can be shortened by performing the fitting step or the adhering step for another preceding stabilizer bar 2 while performing the heating step.

(5) Leaving Step

Figure 7C:
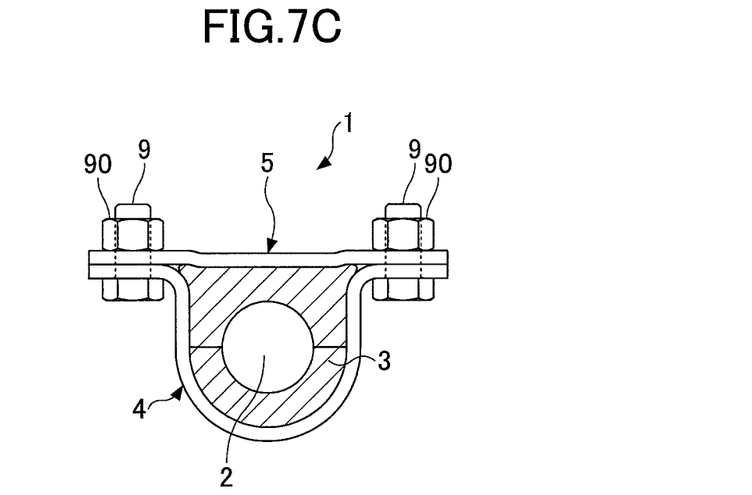
FIG. 7C is a view (3) for explaining the steps from the adhering step in which the stabilizer bar and the rubber bush are adhered, to the leaving step.

Next, as illustrated in FIG. 7C, by detaching the rubber bush provided stabilizer bar 1 in which the rubber bush 3 is fitted in the adhering step from the clamping device 7 and the lower jig 81 (upper jig 82), leaving it for about 30 minutes under a status being fastened by the bolts 9 and the nuts 90, and naturally cooling, the rubber bush provided stabilizer bar 1 as illustrated in FIG. 3 is completed. The leaving time in the leaving step varies based on the material or the diameter of the stabilizer bar 2 or the rubber bush 3, the heating temperature or the like, but becomes shorter as the heating temperature is lower and the diameter is smaller.

The rubber bush provided stabilizer bar 1 manufactured by each of the above described steps is fixed to the frame portion FR of the vehicle by a mounting member that is separately provided at the frame portion FR thereafter.

Figure 8:
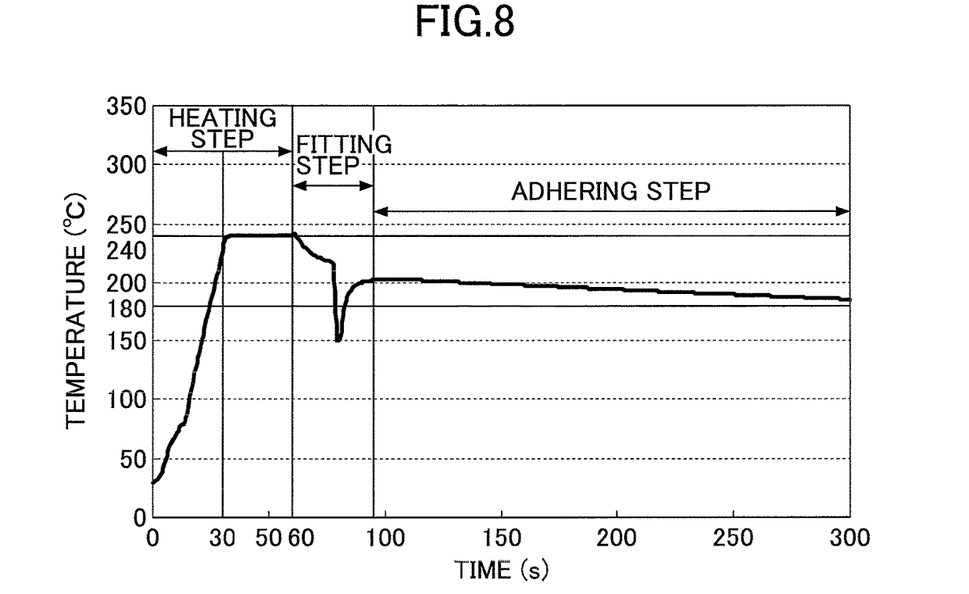
FIG. 8 is a graph illustrating variation of temperature of the stabilizer bar from the heating step to the adhering step.

FIG. 8 is a graph illustrating variation of temperature of the portion to be adhered 20 of the stabilizer bar 2 from the heating step to the adhering step when performing the above described method of manufacturing the rubber bush provided stabilizer bar 1.

Here, the stabilizer bar 2 whose diameter was 35 mm was used and the temperature at a surface portion of the portion to be adhered 20 was measured. As can be understood from the drawing, heating temperature at the heating step was 240° C. and the heating time was 60 seconds. The temperature was increased to 240° C. during the first 30 seconds, and the temperature was retained at 240° C. during the latter 30 seconds.

Thereafter, in the fitting step, as the rubber bush 3 and the upper and lower bracket members whose temperatures were low absorbed heat, the temperature of a surface portion of the portion to be adhered 20 was temporarily drastically decreased to 150° C. However, the center portion of the portion to be adhered 20 was heated in the heating step. Thus, heat conduction occurs from the center portion to the surface portion and the temperature of the surface portion immediately increased to 200° C. Then, in the adhering step, the temperature of the portion to be adhered 20 was kept at greater than or equal to 180° C. (range between 200° C. to 180° C.) necessary for an appropriate vulcanizing reaction for long time.

Thus, in the adhering step, a vulcanizing reaction occurs between the surface 33a of the rubber bush 3 at which the vulcanizing adhesive is coated and the portion to be adhered 20 of the stabilizer bar 2 and both of them can be surely adhered by vulcanizing adhesion.

As described above, in the method of manufacturing the rubber bush provided stabilizer bar 1, the portion to be adhered 20 of the stabilizer bar 2 is previously heated (heating step). Thereafter, the rubber bush 3 at which the vulcanizing adhesive is coated is fitted on the portion to be adhered 20 (fitting step), and they are adhered by pressing (adhering step). In other words, as the heating step of the stabilizer bar 2 is separately provided prior to other steps, it is possible to perform the fitting step or the adhering step for the preceding already heated stabilizer bar 2 while heating the next stabilizer bar 2, so that the total manufacturing time can be shortened and the working efficiency can be improved and energy saving effect can be obtained.

Further, as the heated position is the portion to be adhered 20 of the stabilizer bar 2, the heating time can be suppressed to the minimum, and the heating temperature can be set at temperature at which the coating of the stabilizer bar 2 does not melt and at which the vulcanizing reaction can surely occur. Thus, there is no risk that the stabilizer bar 2 is damaged and poor appearance occurs when heating, and the working efficiency can be improved as the heating time can be performed by the minimum time.

Further, it can be desired for a method of directly heating the portion to be adhered 20 of the stabilizer bar 2 to appropriately perform the temperature management of the portion to be adhered 20. In other words, as the portion to be adhered 20 is exposed right before fitting the rubber bush 3 or various bracket members, whether the temperature of the portion to be adhered 20 is increased to the predetermined temperature can be surely monitored. Then, a temperature management in which temperature drop from the completion of heating to the adhering step is considered can be performed and a high adhesion accuracy can be stably obtained.

Further, according to the method of manufacturing the rubber bush provided stabilizer bar of the embodiment, as the stabilizer bar is pre heated, the following effects can be obtained compared with a conventional case.

According to the conventional manufacturing method in which the stabilizer bar is heated later, as described above, it is necessary to heat the stabilizer bar at higher temperature, such as greater than or equal to 300° C., compared with the pre-heating case. If the coated stabilizer bar is heated at greater than or equal to 300° C., clouding may occur at the coated surface of the heated position. However, as the manufacturing method of the embodiment is pre-heating, it is possible to heat at a lower temperature zone compared with the post-heating case, and the problem that the poor appearance such as clouding or the like of the coated surface occurs near the heated position can be solved.

Second Embodiment

Figure 9:
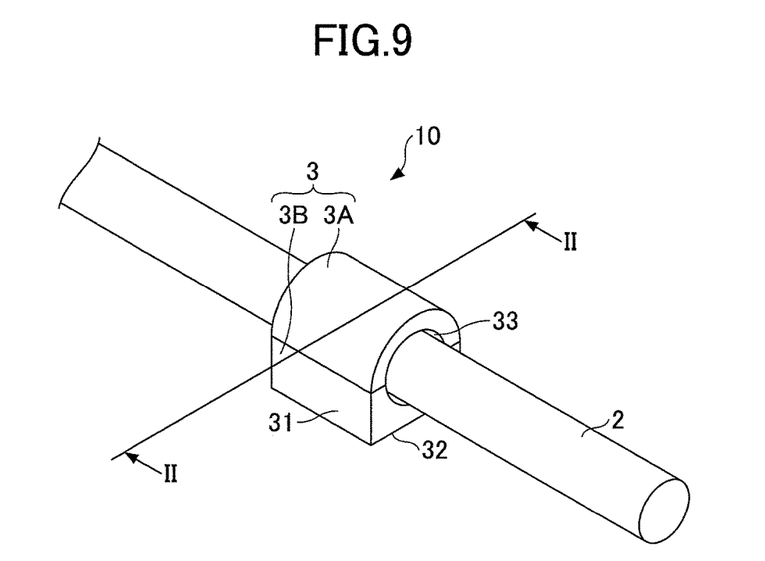
FIG. 9 is a perspective view illustrating the entirety of a rubber bush provided stabilizer bar of a second embodiment.
Figure 10:
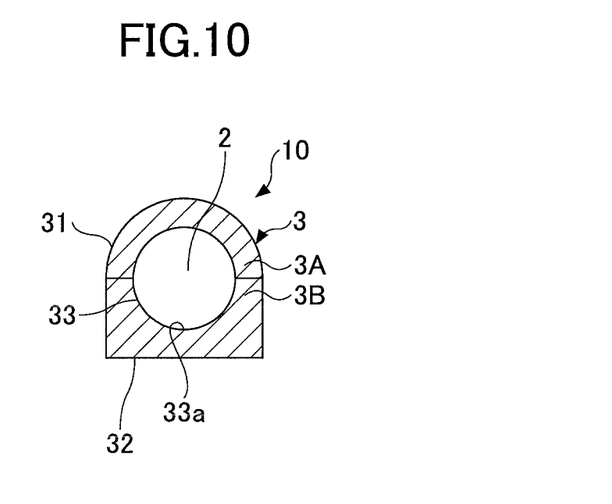
FIG. 10 is a cross-sectional view taken along line II-II of FIG. 9.

Next, the rubber bush provided stabilizer bar 10 of the second embodiment is explained with reference to FIG. 9 to FIG. 10. FIG. 9 is a perspective view of the rubber bush provided stabilizer bar 10 of the second embodiment. FIG. 10 is a cross-sectional view taken along line II-II of FIG. 9.

The rubber bush provided stabilizer bar 10 of the embodiment basically has the same structure as the rubber bush provided stabilizer bar 1 explained in the first embodiment.

The different point is that the upper bracket member 4 and the lower bracket member 5 are not fitted on the outer peripheral surface of the rubber bush 3. In other words, it is structured only by the stabilizer bar 2 and the rubber bush 3. Thus, as the structures of the stabilizer bar 2 and the rubber bush 3 and their adhesion structure are the same as those already explained in the first embodiment, and are not repeated.

The reason that the upper bracket member 4 and the lower bracket member 5 are not used is that the adhesion accuracy between the rubber bush 3 and the stabilizer bar 2 are stably high, as described in the first embodiment. Thus, it is not essential to press and hold the rubber bush 3 by the bracket members, and it is possible to reduce the number of members. With this configuration, the working efficiency can be further improved, the cost can be further reduced, and the energy saving effect can be further improved.

(Manufacturing Method)

Next, a manufacturing method of the rubber bush provided stabilizer bar 10 of the second embodiment is explained. The method of manufacturing the rubber bush provided stabilizer bar 10 of the embodiment overlaps the method of manufacturing explained in the first embodiment for many points. Thus, different points are mainly explained in the following.

(1) Coating Step

Chemlok manufactured by LORD Corporation is coated on the surface 33a of the hollow hole 33 of the vulcanized rubber bush 3 as a vulcanizing adhesive. In this coating step, it is preferable that the vulcanizing adhesive is coated for a plurality of times and a plurality of adhesive layers are formed.

(2) Heating Step

Next, the portion to be adhered 20 of the stabilizer bar 2 is heated using a high-frequency induction heating device by high-frequency induction heating. The heating temperature, the heating time and the frequency in the heating step are the same as those explained in the first embodiment and explanations are not repeated. Further, the method of heating by the high-frequency induction heating device is also the same.

(3) Fitting Step

A fitting step in which the rubber bush 3 is fitted on the portion to be adhered 20 of the stabilizer bar 2 heated in the above described heating step is explained with reference to FIG. 11A to FIG. 11C.

Although the rubber bush 3 of the first embodiment has a structure being housed in (fitted on by) the upper bracket member 4 and the lower bracket member 5, as illustrated in FIG. 9 or the like, nothing is fitted on the outer peripheral surface of the rubber bush 3 in this embodiment. The fitting step of the embodiment is different from that of the first embodiment in that an upper jig and a lower jig that are provided to press the rubber bush 3 after fitting the rubber bush 3 on the portion to be adhered 20 of the stabilizer bar 2.

Figure 11A:
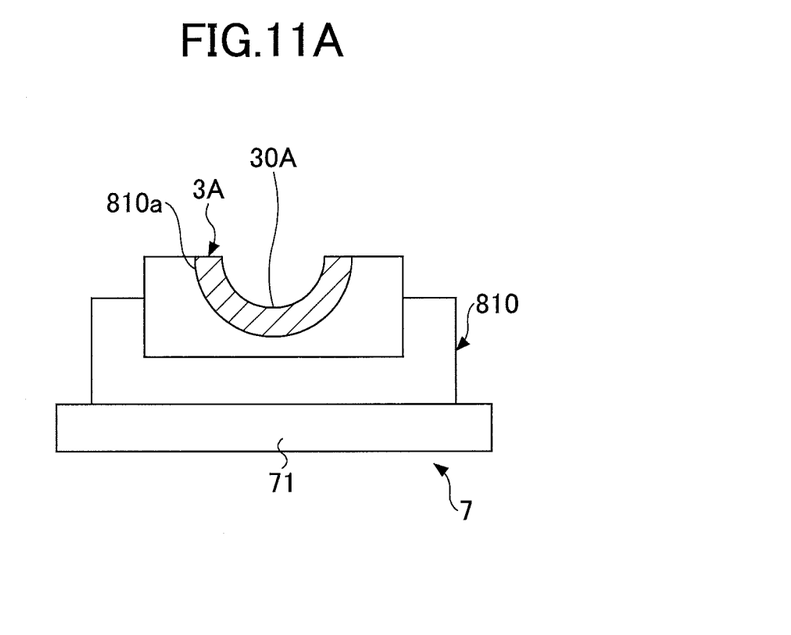
FIG. 11A is a view (1) for explaining steps of a fitting step in which a rubber bush is fitted on a portion to be adhered of the stabilizer bar.

First, as illustrated in FIG. 11A, the upper half portion 3A of the rubber bush 3 is placed in a concave portion 810a provided at an inner side surface of a lower jig 810 that is provided at an upper surface of the base portion 71 of the clamping device 7.

Figure 11B:
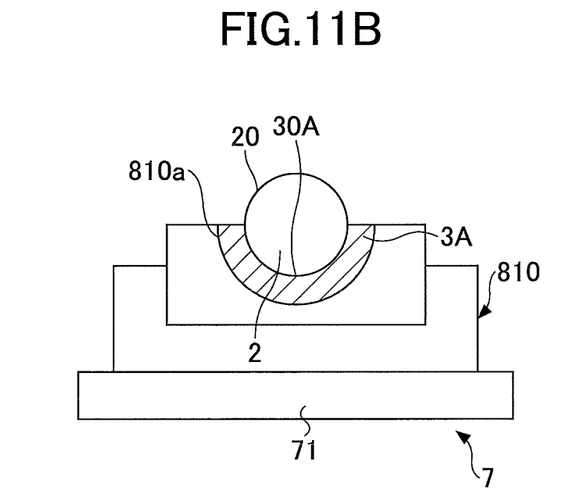
FIG. 11B is a view (2) for explaining the steps of the fitting step in which the rubber bush is fitted on the portion to be adhered of the stabilizer bar.

Next, as illustrated in FIG. 11B, the heated portion to be adhered 20 of the stabilizer bar 2 is placed on the concave portion 30A of the above described upper half portion 3A of the rubber bush 3. At this time, a lower half of the stabilizer bar 2 contacts the concave portion 30A of the upper half portion 3A of the rubber bush 3 and an upper half is exposed, in the drawing.

Figure 11C:
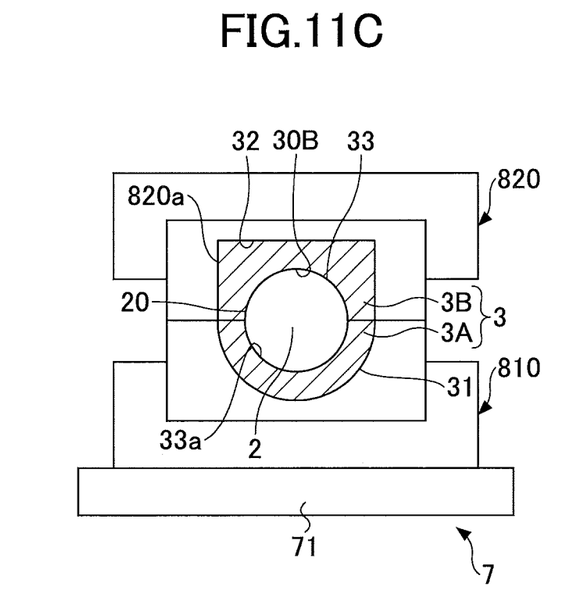
FIG. 11C is a view (3) for explaining the steps of the fitting step in which the rubber bush is fitted on the portion to be adhered of the stabilizer bar.

Then, as illustrated in FIG. 11C, the concave portion 30B of the lower half portion 3B of the rubber bush 3 is fitted to the exposed upper half portion of the to be adhered 20 of the stabilizer bar 2. Thus, at this time, the outer peripheral surface of the portion to be adhered 20 of the stabilizer bar 2 comes to be in contact with the surface 33a of the hollow hole 33 that is formed by the concave portions 30A and 30B of the upper half portion 3A and the lower half portion 3B of the rubber bush 3, respectively.

Then, an upper jig 820 is placed on the flat surface 32 of the rubber bush 3. The upper jig 820 is provided with a U-shaped concave portion 820a at an inner side surface that houses a lower portion of the outer wall surface 31 and the flat surface 32 of the lower half portion 3B of the rubber bush 3. Thus, specifically, the concave portion 820a of the upper jig 820 is fitted in a status of housing the lower portion of the outer wall surface 31 and the flat surface 32 of the rubber bush 3. The lower jig 810 and the upper jig 820 fix the rubber bush 3 in a compressed status by screwing, a clamping member or the like.

(4) Adhering Step

Next, a step in which the rubber bush 3 is clamped in a radial direction by the clamping device 7 to be adhered to the stabilizer bar 2 is explained with reference to FIG. 12A and FIG. 12B.

Figure 12A:
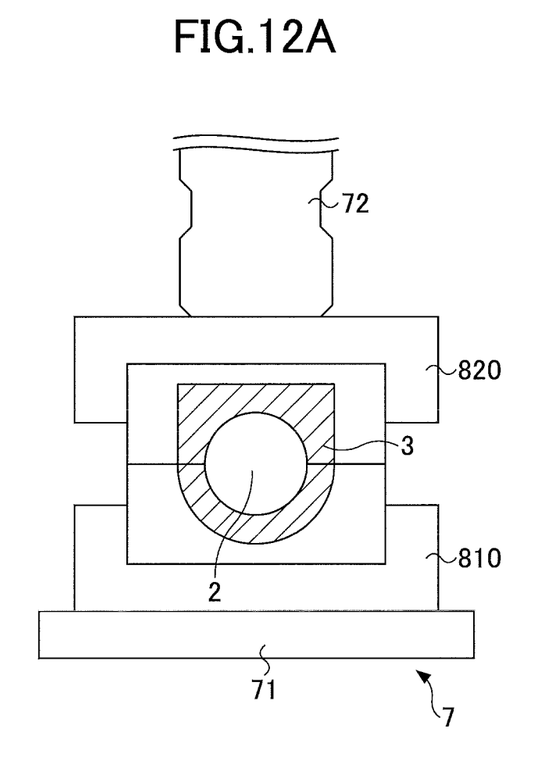
FIG. 12A is a view (1) for explaining steps from an adhering step in which the stabilizer bar and the rubber bush are adhered, to a leaving step.

As illustrated in FIG. 12A, the pressing portion 72 of the clamping device 7 is set at the upper surface of the upper jig 820 and pressed under a status that the upper jig 820 and the lower jig 810 are fitted on the outer peripheral surface of the rubber bush 3 in which the stabilizer bar 2 is housed. Then, the rubber bush 3 is clamped in the radial direction by the upper jig 820 and the lower jig 810 and the rubber bush 3 and the stabilizer bar 2 are rigidly adhered.

Here, the pressing time and the pressing force pressing the rubber bush 3 by the clamping device 7 are set at an optimal condition in accordance with the material or the diameter of the rubber bush 3. In particular, as the rubber bush 3 of the embodiment has a structure in which nothing is fitted on its outer peripheral surface, it is pressed at a condition by which a sufficient fixing strength is obtained.

(5) Leaving Step

Figure 12B:
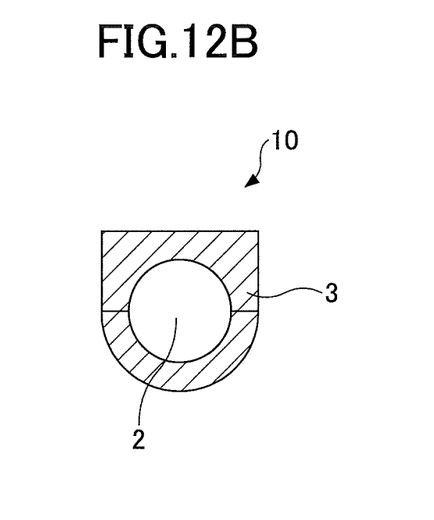
FIG. 12B is a view (2) for explaining the steps from the adhering step in which the stabilizer bar and the rubber bush are adhered, to the leaving step.

The rubber bush provided stabilizer bar 10 is completed as illustrated in FIG. 12B after the rubber bush provided stabilizer bar 10 on which the rubber bush 3 is adhered by the adhering step is detached from the clamping device 7, retained at a clamping status by the above described upper and lower jigs (810, 820) for about 30 minutes, and detaching the upper jig 820 and the lower jig 810 from the rubber bush 3. Here, the rubber bush provided stabilizer bar 10 of the embodiment is fixed to the frame portion FR of the vehicle by a separately provided mounting bracket.

According to the above described method of manufacturing the rubber bush provided stabilizer bar of the second embodiment, it is possible to reduce the number of members to the minimum, further improve the working efficiency, further reduce the cost and further improve energy saving effect compared with the first embodiment. Further, similar to the first embodiment, poor appearance of the stabilizer bar 2 can be prevented, and the high adhesion accuracy can be stably obtained by appropriately performing a temperature management of the portion to be adhered 20.

Although a preferred embodiment of the embodiment has been specifically illustrated and described, it is to be understood that minor modifications may be made therein without departing from the spirit and scope of the invention as defined by the claims.

The present application is based on and claims the benefit of priority of Japanese Priority Application No. 2014-174407 filed on Aug. 28, 2014, the entire contents of which are hereby incorporated by reference.

NUMERALS 1, 10 rubber bush provided stabilizer bar
2 stabilizer bar 20 portion to be adhered
21 torsion portion
22 shoulder portion
23 arm portion
3 rubber bush
31 outer wall surface
32 flat surface
33 hollow hole (centrum)
33a surface
3A upper half portion
30A concave portion
3B lower half portion
30B concave portion
4 upper bracket member
41 housing portion
42 flange portion
42a bolt hole
5 lower bracket member
51 housing portion
52 flange portion
52a bolt hole
6 coil portion
60 high frequency power source
61 arm portion
62 holding portion
63 connecting member
7 clamping device
71 base portion
72 pressing portion
81, 810 lower jig
81a, 810a concave portion
82, 820 upper jig
82a, 820a concave portion
9 bolt
90 nut
K suspension
R link member

What is claimed is:

1. A method of manufacturing a rubber-bush-provided stabilizer bar by adhering a tubular rubber bush, provided with a vulcanized centrum, on a portion to be adhered of a stabilizer bar, the method comprising:
coating a vulcanizing adhesive at a surface of a centrum of the rubber bush;
heating the portion to be adhered of the stabilizer bar;
fitting the centrum of the rubber bush, at which the vulcanizing adhesive is coated, on the heated portion to be adhered of the stabilizer bar;
clamping the rubber bush in a radial direction by a clamping device to adhere the rubber bush on the portion to be adhered of the stabilizer bar;
after the clamping, detaching the stabilizer bar and the rubber bush from the clamping device; and
after the detaching, leaving the stabilizer bar and the rubber bush in a state in which the stabilizer bar and the rubber bush are fastened by an upper member and a lower member for a predetermined period until the stabilizer bar and the rubber bush are naturally cooled.

2. The method of manufacturing the rubber-bush-provided stabilizer bar according to claim 1,
wherein in the heating, the portion to be adhered of the stabilizer bar is heated within a range of temperature from minimum temperature at which a vulcanizing reaction occurs to temperature at which the portion to be adhered of the stabilizer bar is not damaged, and also temperature at which the rubber bush is capable of exerting an adhesive performance.

3. The method of manufacturing the rubber-bush-provided stabilizer bar according to claim 1,
wherein in the heating, the portion to be adhered of the stabilizer bar is heated from a surface of the stabilizer bar up to a center portion of the stabilizer bar.

4. The method of manufacturing the rubber-bush-provided stabilizer bar according to claim 1,
wherein in the detaching, the stabilizer bar and the rubber bush are detached from the clamping device in a state in which the stabilizer bar and the rubber bush are fastened by the upper member and the lower member.

5. The method of manufacturing the rubber-bush-provided stabilizer bar according to claim 1, wherein in the leaving, the upper member and the lower member are fastened by a bolt and a nut.

6. The method of manufacturing the rubber-bush-provided stabilizer bar according to claim 1,
wherein the upper member and the lower member are an upper bracket member and a lower bracket member, respectively,
wherein the clamping includes
fitting the upper bracket member and the lower bracket member around the rubber bush that is fitted around the stabilizer bar, the upper bracket member being placed on a base portion of the clamping device,
pressing the stabilizer bar and the rubber bush by pressing the lower bracket member toward the upper bracket member and the base portion of the clamping device by a pressing portion of the clamping device in a state in which the upper bracket member and the lower bracket member are fitted around the rubber bush, and
after finishing the pressing by the pressing portion of the clamping device, fastening the stabilizer bar and the rubber bush by the upper bracket member and the lower bracket member by a bolt and a nut,
wherein in the leaving, the stabilizer bar and the rubber bush are left in the state in which the stabilizer bar and the rubber bush are fastened by the bolt and the nut.

7. The method of manufacturing the rubber-bush-provided stabilizer bar according to claim 6, wherein the fastening using the bolt and the nut is performed after the pressing portion of the clamping device is released not to press the lower bracket member anymore.

* * * * *